(12) United States Patent
Bouti

(10) Patent No.: US 6,349,886 B1
(45) Date of Patent: *Feb. 26, 2002

(54) INJECTOR NOZZLE AND METHOD

(75) Inventor: Abdeslam Bouti, Swanton, VT (US)

(73) Assignee: Husky Injection Molding Systems Ltd. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/594,572

(22) Filed: Jun. 16, 2000

Related U.S. Application Data

(63) Continuation-in-part of application No. 09/435,965, filed on Nov. 8, 1999, now Pat. No. 6,089,468.

(51) Int. Cl.⁷ ............................................. B05B 17/04
(52) U.S. Cl. ..................... 239/11; 239/404; 239/417.3; 239/422; 239/423; 239/428; 239/533.1; 239/461; 239/489; 239/590.5; 239/591
(58) Field of Search ................................. 239/461, 487, 239/488, 489, 482, 463, 483, 533.1, 590, 590.3, 590.5, 591, 11, 397.5, 5, 564, 568, 399, 403–407, 416.5, 417.3, 422–424, 428, 433, 434.5

(56) References Cited

U.S. PATENT DOCUMENTS

| | | | | |
|---|---|---|---|---|
| 1,315,765 A | * | 9/1919 | Eckart | 239/404 |
| 1,684,488 A | * | 9/1928 | Haeusser et al. | 239/404 |
| 4,014,469 A | * | 3/1977 | Sato | 239/404 |
| 5,916,605 A | | 6/1999 | Swenson et al. | |
| 6,089,468 A | * | 7/2000 | Bouti | 239/11 |

FOREIGN PATENT DOCUMENTS

| | | |
|---|---|---|
| EP | 0 825 008 | 2/1998 |
| EP | 0 911 138 | 4/1999 |

* cited by examiner

*Primary Examiner*—David A. Scherbel
*Assistant Examiner*—Christopher S. Kim
(74) *Attorney, Agent, or Firm*—Bachman & LaPointe, P.C.

(57) ABSTRACT

A coinjection nozzle communicating with a mold cavity to form a multilayered article and an injection molding method are provided. The nozzle includes at least two flow channels communicating with an outlet, with each flow channel including at least one spiral groove that decreases in depth towards the outlet area to eliminate weld lines and dips in the resultant article.

26 Claims, 4 Drawing Sheets

INJECTOR NOZZLE AND METHOD

CROSS-REFERENCE TO RELATED APPLICATIONS

The present invention is a Continuation-In-Part of U.S. patent application Ser. No. 09/435,965, for NOZZLE TIP WITH WELD LINE ELIMINATOR, filed Nov. 8, 1999, now U.S. Pat. No. 6,089,468, by Abdeslam Bouti.

BACKGROUND OF THE INVENTION

The present invention relates to an improved coinjection nozzle for injection molding and to an improved injection molding method.

Hot runner injection nozzles having torpedoes or valve stems in the melt stream typically create weld line blemishes in the finished part caused by the melt stream being divided by these obstructions and having to reform downstream thereof. The present invention provides an improved injection nozzle and method which includes an improved flow channel geometry to eliminate or significantly minimize these weld lines, while at the same time permitting faster color change performance.

When plastic melt flows through a hot runner system on route to a mold cavity, it sometimes must separate from a single solid cylindrical flow mass to pass by obstructions, such as torpedos, support fins and blades, valve stems, stem guides or support blades or other melt ducts or nozzles, etc. When thus divided, the disturbed melt stream recombines downstream of the obstruction and there forms at least one weld line as the melt streams from the divergent paths come back together. Such a weld line, unless remixed homogeneously, thereafter continues to be present, in the melt stream and appears as a blemish or line in the molded part formed in the mold cavity. This may also result in preferential flow and other problems. Also when changing color of the melt considerable amounts of resin are wasted in flushing out the old color that is caught or stuck to these flow obstructions.

In coinjection, different melt streams are passed through the injection nozzle to make a multimaterial or multilayered part or preform. Thus, the coinjection nozzle effectively consists of several nozzles assembled coaxially to form annular spaces therebetween to run the various materials that make a coinjection molded part. These annular spaces are usually fed by one or more portals. When each material or melt is fed into one of the annular spaces at least one weld line is formed in each melt stream. In addition, a preferential flow occurs on the side that the nozzle is fed from. A weld line and a preferential flow are also generated when the melt flows around a valve stem. The resultant weld lines are then transferred to the resultant part and the preferential flow induces what is known in preform coinjection as a "dip" in the neck of the preform, for example. The weld lines are weaknesses in the part that may induce its premature failure or its failure at low stress loading conditions. In the case of preform molding, the presence of a weld line may induce part failures during blow molding, or failure of a blow molded bottle at lower stress loading conditions. In coinjection molded preforms, a dip or unsymmetrical distribution of an intermediate resin layer, which may be generated by the weld lines and preferential flow, is a significant defect of coinjection molded preforms as it represents an area that does not have the same layered structure as the rest of the preform and therefore has poor properties, for example, barrier and mechanical properties. The dip may also represent a visual defect in the preforms or final part.

It is, therefore, a principal object of the present invention to provide an improved coinjection nozzle and method.

It is a still further object of the present invention to provide an improved coinjection nozzle and method as aforesaid which eliminates or significantly minimizes weld lines and dips in the molded article, and also to provide an improved method of simultaneous coinjection of two or more materials.

Further objects and advantages of the present invention will appear hereinbelow.

SUMMARY OF THE INVENTION

In accordance with the present invention the foregoing objects and advantages arc readily obtained.

The coinjection nozzle of the present invention comprises: a first flow channel for a first resin flow communicating with an outlet area for transferring molten first resin to a mold cavity, said first flow channel including an outer surface thereof, an elongated shaft extending in the first flow channel adjacent the outlet area, at least one first spiral groove formed in the outer surface of the first flow channel and facing the shaft that decreases in depth towards the outlet area, with lands adjacent said first groove that increase in clearance towards the outlet area, wherein a helical flow path of said first resin is provided through the first spiral groove and an axial flow path of said first resin is provided over the lands; and at least one second flow channel for a second resin flow communicating with said outlet area, at least one second spiral groove in the second flow channel that decreases in depth towards the outlet area with lands adjacent said second groove that increase in clearance towards the outlet area, wherein a helical flow path of said second resin is provided through the second spiral groove and an axial flow path of said second resin is provided over the lands.

The coinjection method of the present invention comprises: supplying a first molten resin to a first flow channel having an outer surface thereof, in an injection nozzle, which first flow channel extends in said nozzle to an outlet area for transferring said first me resin to a mold cavity, providing an elongated shaft in said first flow channel adjacent said outlet area, transferring said first molten resin to at least one first spiral groove, with lands adjacent said first groove, said first groove formed in the outer surface of said first flow channel and transferring said first resin from said first groove to said outlet area, decreasing the depth of said first groove toward the outlet area and increasing the clearance of said lands towards the outlet area, thereby flowing said first resin in a helical flow path through the first spiral groove and in an axial flow path over the lands; and supplying a second molten resin to a second flow channel in said injection nozzle, which second flow channel communicates with said outlet area, transferring said second molten resin to at least one second spiral groove in said second flow channel with lands adjacent said second groove, and transferring said second resin from said second groove to said outlet area, decreasing the depth of said second groove towards the outlet area and increasing the clearance of said lands towards the outlet area, thereby flowing said second resin in a helical flow path through the second spiral groove and in an axial flow path over the lands.

Further features of the present invention will appear hereinbelow.

BRIEF DESCRIPTION OF THE DRAWINGS

The present invention will be more readily understandable from a consideration of the accompanying illustrative drawings, wherein.

DETAILED DESCRIPTION OF PREFERRED EMBODIMENTS

Figure 1:
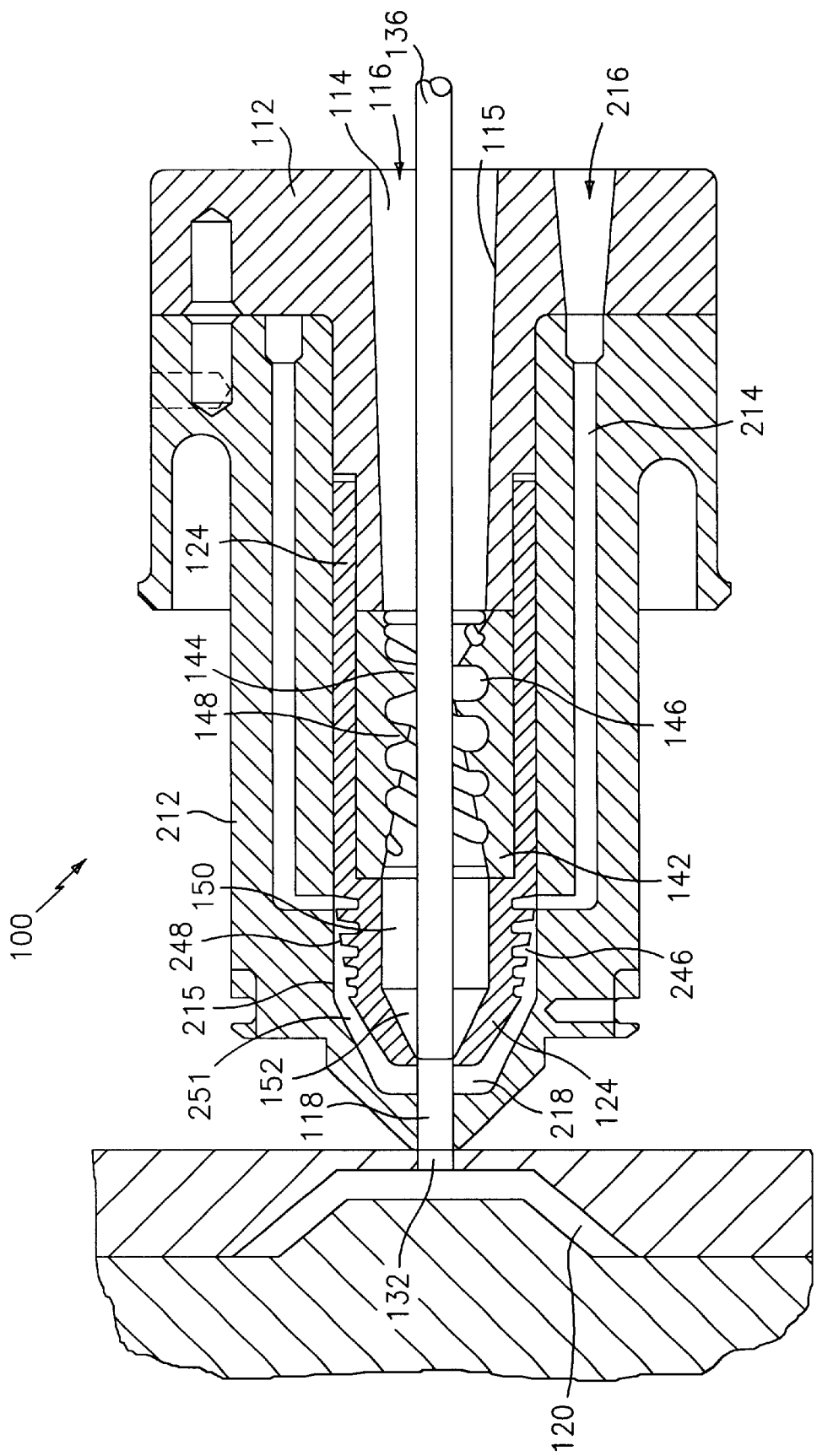
FIG. 1 is a partial sectional view of an exemplicative embodiment of the present invention.

In a spiral mandrel die used for extrusion molding the melt stream is first divided into several separate streams using a star shaped, or ring shaped distributor. The streams are then fed into separate spiraling channels cut into the mandrel like a multi-start thread. The depth of the channels constantly decreases and the gap between the mandrel and the inner die wall constantly increases in the direction of flow. This causes a flow stream initially confined within a closed spiral to divide into two streams as it emerges into the widening gap. One stream continues to flow in the spiral channel next to the mandrel wall continuing in a helical direction while a second stream flows over the land of the spiral channel divider and flows in an axial direction. As the spiral channel depth decreases more and more of tie resin is added to the axial flow direction. Thus the flow stream gradually transforms from a helical flow direction to an axial flow direction without the creation of weld lines and with the increased mechanical homogeneity and uniformity of melt temperature. This function of operation is not taught by U.S. Pat. No. 4,965,028 which does not teach reducing the channel depth while increasing the wall clearance through the annular flow section of the tip.

When the spiral mandrel die design theory is applied to a hot runner nozzle tip it has been found that with the spiral channels cut into the outer surface of a torpedo insert weld lines are completely eliminated from the surface of the molded part next to the mold core surface, opposite the gate, while blemishes may still occur on the opposed surface formed next to the mold cavity surface adjacent the gate. This approach is shown in U.S. Pat. Nos. 5,783,234 and 5,900,200. In contrast, when the spiral channels are cut into the outer surface of the nozzle channel opposite the torpedo as in accordance with the present invention, the weld lines are completely eliminated from the surface of the molded part next to the mold cavity surface adjacent the gate while blemishes may still remain on the opposed surface formed next to the mold core surface opposite the gate. Since in most cases this mold cavity formed surface is the outside or shown surface of the molded part, this nozzle configuration represents a much preferred operation.

In accordance with the present invention, the, spiral mandrel die principal is used to eliminate the weld lines and the preferential flow from the annular melt streams generated between the different coaxial nozzles that male a coinjection nozzle, as well as the annular melt flow between the valve stem and the nozzle. In order to perform this function, the annular spaces between the nozzle portions are provided with helical grooves where all the melt stream is converged. After transfer of the melt into these grooves, a gap that increases progressively in the melt stream direction is provided and the depth of the grooves is decreased progressively along with an increase in the gap. The grooves may naturally be formed on either the internal or external wall of the annular space between the coaxial nozzle portions. The structure may have several conversions and parameters depending upon the preferred or desirable manufacturing process for these grooves and/or on the aesthetics of the molded part or its preferred layered structure. Thus, at least one smaller witness mark may be generated by the initial gap and this mark may be transferred either to the front or the back of the part or layer in coinjection, depending upon the construction of the nozzle.

Thus, the spiral mandrel die principal is used in the present invention to eliminate flow lines and preferential flows and to produce uniform, homogenous annular flows in coinjection nozzles.

In accordance with the present invention, the melt streams are discharged into respective spiraling channels through which they wind their way in the form of a multiple thread. The depth of the channel decreases steadily and the gap between the mandrel and the outer part of the die or die housing increases steadily in the direction of extrusion. Thus, the melt stream flowing through one spiral divides itself into two partial streams. One of the streams flows axially over a land formed between spirals and the other flows the course of the spiral channel in the helical direction. This melt stream is formed by the superposition of the partial axial and helical channels. By this arrangement, there is a gradual transformation of helical flow to axial flow without creation of weld lines and with obtaining a desired mechanical homogeneity and uniform melt temperature. Towards the end of the spiral section, there is only annular flow in the axial direction. This results in substantially complete elimination of weld lines and therefore elimination of flow lines or striation marks which represents considerable advantages of the present invention. In addition, a further advantage of the present invention is the annular flow with uniform velocity profile.

The present invention provides extensive advantages in coinjection molding. The present invention achieves substantially complete elimination of weld lines which transforms into improved blow moldability of preforms and stronger part walls. The present invention also provides a uniform and homogeneous flow of resin which leads to a uniform layering structure in coinjection molded parts. Further, the present invention substantially eliminates the dip effect often observed in preform coinjection molding and improves the layered structure of the molded parts. Further, the present invention reduces nozzle and valve stem shifting due to preferential flow and therefore reduces premature wear of the parts.

Further features and advantages of the present invention will appear hereinbelow.

Referring to FIG. 1, a valve gate style coinjection nozzle 100 is shown including a hot runner nozzle housing 112 and a cylindrical first melt flow channel 114 in the housing. The flow channel 114 includes an outer surface 115 thereof, inlet area 116 for receiving a first molten resin and a first outlet area 118 for transferring the first molten resin to mold cavity 120. Coinjection nozzle 100 includes a forward end or nozzle tip 124 downstream of nozzle housing 112 and connected thereto.

Elongated torpedo or valve stem 136 is provided extending in flow channel 114 adjacent first outlet area 118. The torpedo may if desired have a flat forward area as shown or a curved rear area and a pointed forward area extending to gate 132. Torpedo or valve stem 136 may desirably be movable to progressively block or open gate 132 or first outlet area 118 and the connection of the first flow channel 114 to the first outlet area 118. Thus, the elongated shaft or torpedo 136 may if desired be a movable valve stem operative to permit and stop resin flow. Naturally, the torpedo or valve stem may have any suitable or convenient configuration. Nozzle tip 124 traps sleeve 142 in place against nozzle housing 112 with the torpedo or valve stem 136 within sleeve 142 and engaged thereto at contact areas 144, or bonded thereto at contact areas 144. The torpedo or valve stem is desirably made of steel and can also for example be made of a thermally conductive material such as beryllium copper or tungsten carbide, while the sleeve can be made of any hard wearing material such as steel or tungsten carbide, possibly manufactured by electrical discharge machining (EDM), powder metal molding, turning, broaching, casting and tapping or any other suitable process.

The outer surface of torpedo 136 is desirably cylindrical. The exposed surface of sleeve 142 includes at least one first spiral groove 146. Since the exposed surface of sleeve 142 at least in part forms the outer surface 115 of flow channel 114, the at least one spiral groove 146 is formed in the outer surface of the flow channel and as can be seen in FIG. 1 is cut into the outer surface of the flow channel. In addition, said spiral groove faces torpedo 136.

Lands 148 are provided adjacent said groove. The groove is formed so that it decreases in depth towards first outlet area 118 and towards gate 132. Lands 148 desirably contact torpedo 136 at contact area 144 at the upstream end of sleeve 142. The lands 148 present an initial clearance and increase in clearance with respect to torpedo 136 towards first outlet area 118 and towards gate 132. The initial clearance is an optional feature and is desirably at least 0.05 mm. This initial clearance is important for color change performance as it enables the flushing of any resin that may hang-up in the dead spots generated between the spiral grooves. Otherwise, the resin will tend to fill part of the small initial clearance and hang-up there for a longer period of time making color change very lengthy. Also, the resin may hang-up there until it degrades and bleeds back into the melt stream. However, with an initial clearance of at least 0.05 mm this abrupt, definite clearance at the end of the contact between the lands and the shaft enables part of the melt stream to flow in the circumference between the grooves to clean the dead spots.

In operation, therefore, the melt flows from the inlet end 116 of flow channel 114 towards the outlet end of flow channel 114 through the annular portion of the flow channel. The melt enters one or more of spiral grooves or channels 146 before reaching the first outlet area 118. The spiral grooves induce a helical flow path to the melt. As the melt progresses towards the gate 132 progressively more and more of the melt spills over lands 148 as the lands increase in clearance and as the groove depth decreases so that the helical flow direction is gradually changed to an axial flow direction over the length of sleeve 142. At the end of the spiral groove section, the melt passes to first annular section 150 of flow channel 114 downstream of groove 146 which is comparatively large in diameter, and then passes to a further annular section 152 of channel 114 downstream of first annular section 150 which is reduced in diameter and which is located prior to the end of nozzle tip 124 such that the melt stream is relaxed as it flows through the annular sections. The relaxation section helps to minimize stresses and any flow irregularities and homogenize the melt. Finally, the melt passes through gate 132 to enter the mold cavity 120.

The flowlines eliminator tip design for the internal or first flow channel can be defined by the following five zones:

A zone of adherence (torpedo version or stem guide or another nozzle) or sliding contacts (valve stem version) between the lands and the shaft may feature a tapered seat that locks the shaft to resist pressure action in the case of a torpedo. This zone provides the support and/or alignment for the torpedo or valve stem guide or guidance of the valve stem.

A zone of a finite initial gap or initial clearance that consists of an abrupt elimination of the contact between the sleeve lands and the shaft. This feature prevents resin hang-ups that may occur when the clearance increase starts from zero. The initial gap allows part of the melt to flow around and clean the dead spots generated between the grooves at the beginning of the clearance increase. The initial clearance value depends on the material processed and the process parameters (flow rate, etc.).

A zone of flow conversion where the melt stream is converted gradually into an annular flow without creating weld lines that will appear in the molded part. In this zone the depth of the grooves decreases gradually and the gap between the shaft and the lands increase gradually.

A relaxation zone that enables the polymer's molecules to relax from the stresses accumulated during the flow conversion in the previous zone. The relaxation zone can be used as well as a run-out for manufacturing tools.

A conformation zone that squeezes the melt through a tight annular section to reduce the thickness variations that may have been generated by the successive spillovers that occurred during flow conversion. This zone can be an annular section that converges towards the gate if it is required by the application.

In addition, nozzle 100 includes a second flow channel 214 which flows circumferentially around first flow channel 114 and includes an inlet area 216 for receiving a second molten resin and a second flow channel outlet area 218 communicating with first outlet area 118 for transferring the second molten resin through gate 132 to mold cavity 120. Second flow channel 214 includes at least one second spiral groove 246 in the outer surface of nozzle tip 124 forming the inner surface of second flow channel 214 and facing outer nozzle housing 212. Lands 248 are provided adjacent said second groove. Moreover, similar to the first groove 146, the second groove is formed so that it decreases in depth towards outlet areas 218 and 118 and towards gate 132. Lands 248 may he bonded to or contact outer wall 215 of second flow channel 214 at the upstream end of nozzle tip 124 as in the first flow channel 114. However, in the embodiment of FIG. 1, lands 248 present an initial clearance with respect to outer wall 215, and an increase in clearance towards outlet areas 218 and 118 and towards gate 132. The initial clearance desirably may have the same dimensions as in the first flow channel and offers the same advantages.

In operation in the second flow channel, therefore, the second melt flows from the inlet end 216 of flow channel 214 towards the outlet end of flow channel 214 through the annular portion of the flow channel. The second melt enters one or more of spiral grooves or channels 246 before reaching the second flow channel outlet area 218 through portals that may desirably be aligned with the start of the helical groove. The alignment may be provided by a dowell pin or locating pin between nozzle housing 112 and outer nozzle housing 212. The spiral grooves induce a helical flow path to the melt. As the melt progresses towards the gate 132 progressively more and more of the melt spills over lands 248 as the lands increase in clearance and as the groove depth decreases so that the helical flow direction is gradually changed to an axial flow direction over the length of grooves 246. At the end of the spiral groove section, the melt passes to a second flow channel annular section 251 of flow channel 214 downstream of grooves 246, and then passes to second flow channel outlet area 218, outlet area 118, gate 132 and mold cavity 120.

Desirably, the first and second melt flows are sequential, although simultaneous flows or partially simultaneous flows are possible if desired.

Moreover, the coinjection nozzle of the present invention offers the significant advantages discussed hereinabove.

Figure 2:
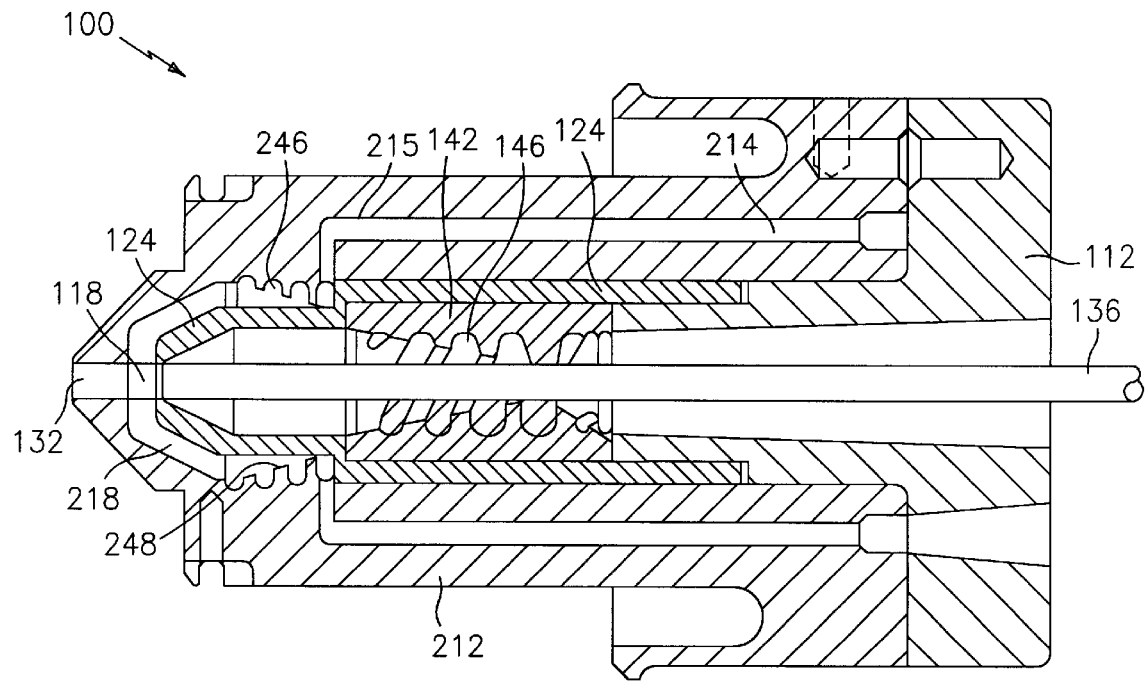
FIGS. 2 and 2A are partial sectional views of further embodiments of the present invention.

The embodiment of FIG. 2 is similar to FIG. 1 except that the second spiral groove 246 is formed in the outer surface 215 of second flow channel 214 opposed to nozzle tip 124. In addition, the second groove 246 decreases in depth towards outlet areas 218 and 118 and with lands 248 increasing in clearance towards outlet areas 218 and 118.

Figure 2A:
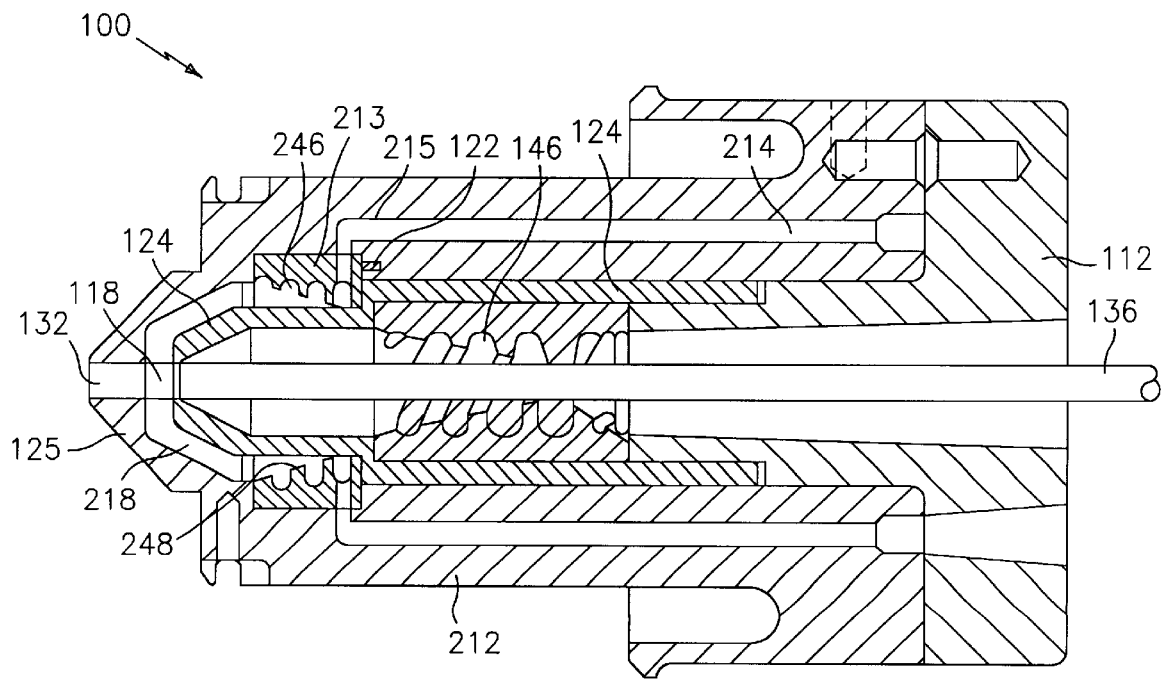

The embodiment of FIG. 2A is similar to the embodiment of FIG. 2 showing grooves 246 in outer nozzle housing 212 formed in a separate insert 213 located by locating pin 122 and held in place by nozzle cap 125.

Figure 3:
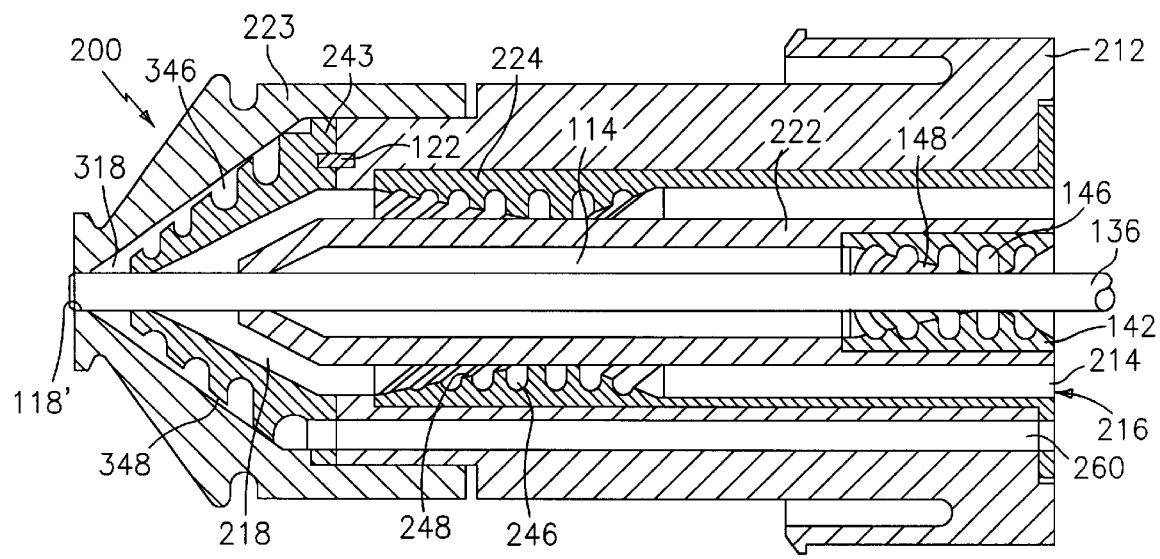
FIGS. 3 and 3A are further partial sectional views of further embodiments of the present invention.

The embodiment of FIG. 3 includes a third flow channel 260 in injection nozzle 200. Injection nozzle 200 includes nozzle housing 212 and inner nozzle 222. First flow channel 114 for first molten resin flow includes first sleeve 142 held in place by inner nozzle 222 and forming first spiral groove 146. Second inner nozzle 224 forms second spiral groove 246 in second flow channel 214 for second molten resin flow. The third molten resin flows in third flow channel 260 in the outermost portion of nozzle 200 through outer sleeve 243 which is held in place by outer nozzle tip 223 and locating pin 122. First spiral groove 146 decreases in depth towards third outlet area 318 and outlet area 118' and first lands 148 increase in clearance towards third outlet area 318 and outlet area 118'. Similarly, second spiral groove 246 decreases in depth towards outlet areas 318 and 118' and second lands 248 increase in clearance towards outlet areas 318 and 118'. Also, third spiral groove 346 decreases in depth towards outlet areas 318 and 118' and third lands 348 increase in clearance towards outlet areas 318 and 118'. In the embodiment of FIG. 3, if desired first sleeve 142 and first spiral groove 146 may be located relatively farther upstream from the second spiral groove than in the embodiments of FIGS. 1 and 2. Also, in the embodiment of FIG. 3, molten resin flows from first spiral groove 146 directly into first flow channel 114. Also, desirably, the resin flows are sequential.

Thus, the flow paths of the first, second and third resins are through spiral grooves that decrease in depth towards the outlet areas and with lands adjacent the grooves that increase in clearance towards the outlet areas so that a helical flow path of the resins is provided through the respective spiral grooves and all axial flow path of the resins is provided over the respective lands.

Moreover, the coinjection nozzle of FIG. 3 with three (3) resins obtains the aforesaid considerable advantages of the present invention, e.g., elimination of weld lines homogeneous flow and uniform annular flow velocity which leads to uniform layering, elimination of the dip effect and reduction of nozzle shifting.

Figure 3A:
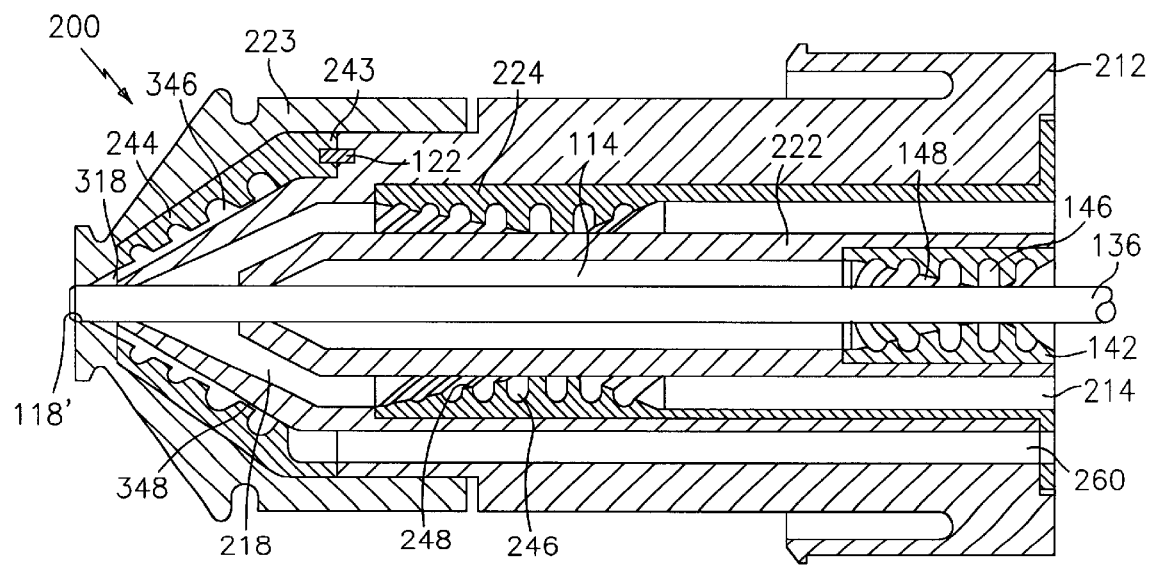

The embodiment of FIG. 3A is similar to the embodiment of FIG. 3 showing the third spiral groove 346 on the inside surface of insert 244.

Figure 4:
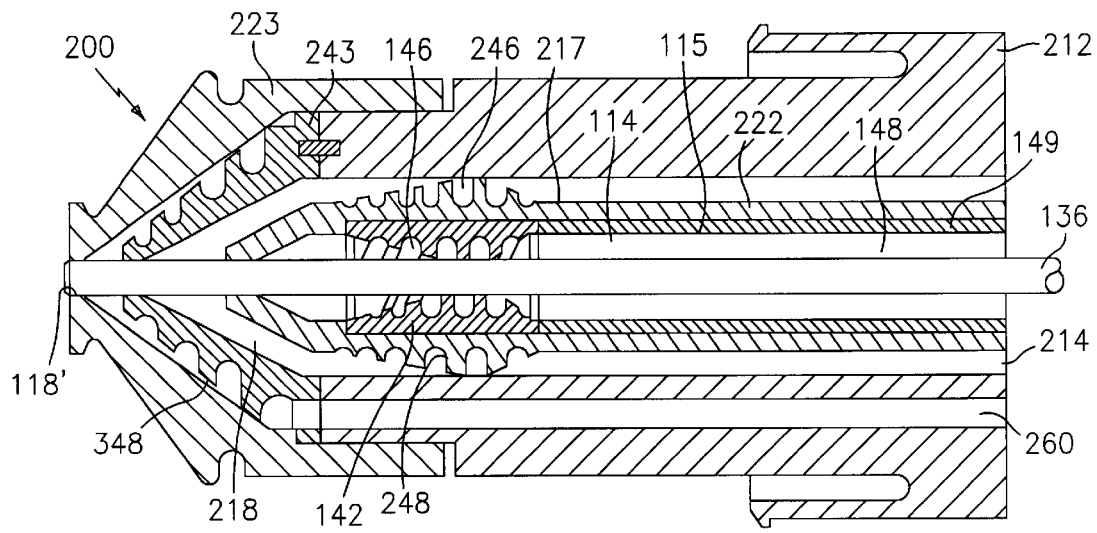
FIGS. 4 and 5 are partial sectional views of further embodiments of the present invention.
Figure 5:
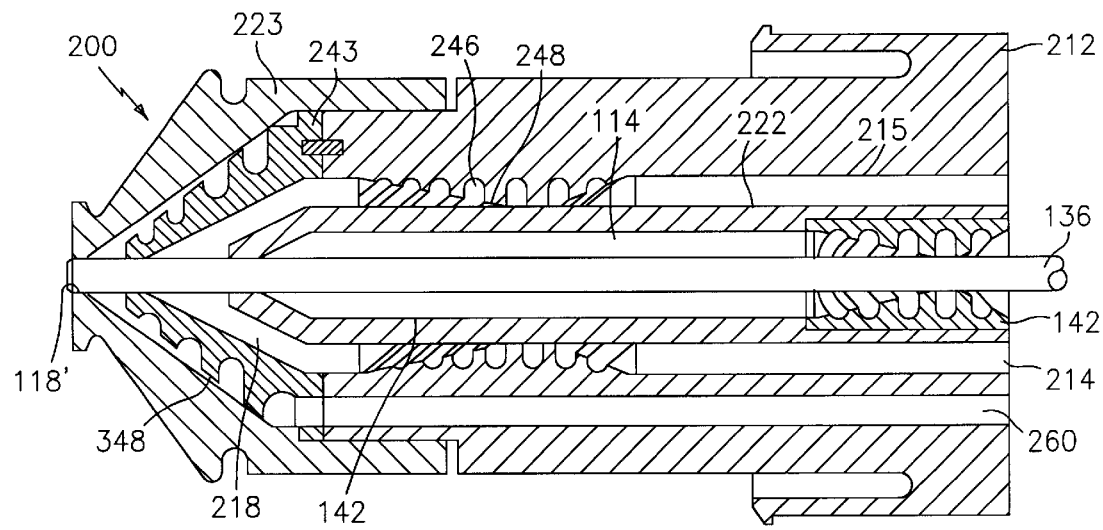

The embodiments of FIGS. 4 and 5 both show a coinjection nozzle 200 with three flow channels 114, 214 and 260 for three molten resin flows, as with the embodiment of FIG. 3.

However, in the embodiment of FIG. 4, the second spiral groove 246 is formed in the inner surface 217 of second flow channel 214 in the inner nozzle 222, with lands 248 and grooves 246 facing nozzle housing 212. Also, the first spiral groove 146 in first flow channel 114 is formed in first sleeve 142 held in place in the forward end of first flow channel 114 by first retainer 149 which forms an outer surface 115 of the first flow channel 114.

In the embodiment of FIG. 5, the second spiral groove 246 is formed in the outer surface 215 of second flow channel 214 in nozzle housing 212, with lands 248 and grooves 246 facing inner nozzle tip 222.

Advantageously, if desired the lands may first decrease in clearance followed by an increase in clearance as shown for example for lands 248 in FIG. 4. Also, if desired, each flow channel could have separate outlet areas leading directly to the mold cavity.

Both embodiments of FIGS. 4 and 5 obtain the significant advantages of the present invention as with FIGS. 1–3.

The present invention is highly advantageous for coinjection molding. Testing has demonstrated that the present invention substantially eliminates weld lines, produces a homogeneous melt, and enables fast color changes and a stronger molded part, particularly in the gate area.

Significant features of the present invention include the spiral flow channels with their decreasing depth and increasing land clearance. The initial clearance with a finite length minimizes or eliminates possible hang-ups at the start of clearance. The initial clearance is a significant feature for color change performance as it enables the flushing of any resin that may hang-up in the dead spots generated between the spiral grooves. In case of the absence of initial clearance, the resin fills part of the small clearance and then hangs-up there for a longer time making color change very lengthy. The resin may also hang-up there until it degrades and bleeds back into the melt stream. The present invention eliminates or substantially minimizes flow lines especially if no initial clearance is provided. However, when an abrupt definite clearance is provided at the end of the contact between the lands and the shaft, it is possible to enable part of the melt stream to flow in the circumference between the grooves to clean the dead spots. In addition, a relaxation space may be provided downstream of the spiral channels. The present invention is also suitable for use with both pin point torpedo, stem guiding torpedo, and sliding valve stem configurations and is particularly versatile.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A coinjection nozzle, which comprises:
    a first flow channel for a first resin flow communicating with a first outlet area for transferring molten first resin, said first flow channel including an outer surface thereof, an elongated shaft extending in the first flow channel adjacent the first outlet area, at least one first spiral groove formed in the outer surface of the first flow channel and facing the shaft that decreases in depth towards the first outlet area, with lands adjacent said first groove that increase if clearance towards the first outlet area, wherein a helical flow path of said first resin is provided through the first spiral groove and an axial flow path of said first resin is provided over the lands; and at least one second flow channel for a second resin flow communicating with a second outlet area for transferring molten second resin, at least one second spiral groove in the second flow channel that decreases in depth towards the second outlet area with lands adjacent said second groove that increase in clearance towards the second outlet area, wherein a helical flow path of said second resin is provided through the second spiral groove and an axial flow path of said second resin is provided over the lands.

2. A nozzle according to claim 1, wherein a portion of the lands in the first flow channel contact the shaft and wherein the lands increase in clearance with respect to the shaft towards the first outlet area.

3. A nozzle according to claim 1, wherein said shaft is a movable valve stem operative to permit and stop resin flow.

4. A nozzle according to claim 1, including a first annular section of said first flow channel downstream of said first spiral groove.

5. A nozzle according to claim 4, including a further annular section of said first flow channel downstream of said first annular section, wherein said further annular section has a reduced diameter.

6. A nozzle according to claim 1, wherein said helical flow path in said first and second flow paths is gradually changed to axial flow paths.

7. A nozzle according to claim 1, wherein said second flow channel flows circumferentially around said first flow channel.

8. A nozzle according to claim 1, including a sleeve in the first flow channel adjacent the elongated shaft, wherein said first groove is formed in the sleeve.

9. A nozzle according to claim 8, including a nozzle tip adjacent the forward end of the first flow channel holding the sleeve in place.

10. A nozzle according to claim 9, wherein said second groove is formed in the outer surface of said nozzle tip.

11. A nozzle according to claim 1, including a second annular section downstream of said second groove.

12. A nozzle according to claim 1, wherein the second groove is formed in the outer surface of said second flow channel.

13. A nozzle according to claim 1, including at least one third flow channel for a third resin flow communicating with a third outlet area for transferring molten third resin, at least one third spiral groove in the third flow channel that decreases in depth towards the third outlet area with lands adjacent said third groove that increase in clearance towards the third outlet area, wherein a helical flow path of said third resin is provided through the third spiral groove and an axial flow path of said third resin is provided over said lands.

14. An injection molding method, which comprises:
supplying a first molten resin to a first flow channel having an outer surface thereof, in an injection nozzle, which first flow channel extends in said nozzle to a first outlet area for transferring said first molten resin, providing an elongated shaft in said first flow channel adjacent said outlet area, transferring said first molten resin to at least one first spiral groove, with lands adjacent said first groove, said first groove formed in the outer surface of said first flow channel and transferring said first resin from said first groove to said first outlet area, decreasing the depth of said first groove toward the first outlet area and increasing the clearance of said lands towards the first outlet area, thereby flowing said first resin in a helical flow path through the first spiral groove and in an axial flow path over the lands; and supplying a second molten resin to a second flow channel in said injection nozzle, which second flow channel communicates with a second outlet area for transferring molten second resin, transferring said second molten resin to at least one second spiral groove in said second flow channel with lands adjacent said second groove, and transferring said second resin from said second groove to said second outlet area, decreasing the depth of said second groove towards the second outlet area and increasing the clearance of said lands towards the second outlet area, thereby flowing said second resin in a helical flow path through the second spiral groove and in an axial flow path over the lands.

15. A method according to claim 14, including contacting a portion of the lands in the first flow channel to the shaft and increasing the clearance of the lands in the first flow channel with respect to the shaft towards the first outlet area.

16. A method according to claim 14, including providing that the shaft is a movable valve stem operative to permit and stop resin flow.

17. A method according to claim 14, including transferring first molten resin from said first spiral groove to a first annular section of said first flow channel downstream of said first spiral groove.

18. A method according to claim 17, including transferring said first molten resin from said first annular section of said first flow channel to a further annular section of said first flow channel downstream of said first annular section wherein said further annular section has a reduced diameter.

19. A method according to claim 14, including the steps of gradually changing said helical flow paths in said first and second flow paths to axial flow paths.

20. A method according to claim 24, wherein said second flow channel flows circumferentially around said first flow channel.

21. A method according to claim 14, including providing a sleeve in the first flow channel adjacent the elongated shaft and forming said first groove in the sleeve.

22. A method according to claim 21, including providing a nozzle tip adjacent the forward end of the first flow channel holding the sleeve in place.

23. A method according to claim 22, including forming the second groove in the outer surface of the nozzle tip.

24. A method according to claim 14, including providing a second annular section downstream of the second groove.

25. A method according to claim 14, including forming the second groove in the outer surface of the second flow channel.

26. A method according to claim 14, including supplying a third molten resin to a third flow channel in said injection nozzle, which third flow channel communicates with a third outlet area for transferring molten third resin, transferring said third molten resin to at least one third spiral groove in said third flow channel with lands adjacent said third groove, and transferring said third resin from said third groove to said third outlet area, decreasing the depth of said third groove towards the third outlet area and increasing the clearance of said lands towards the third outlet area, thereby flowing said third resin in a helical flow path through the third spiral groove and in an axial flow path over the lands.

\* \* \* \* \*